United States Patent
Ko et al.

(10) Patent No.: US 7,810,967 B2
(45) Date of Patent: Oct. 12, 2010

(54) ADJUSTABLE GRILL LIGHT AND METHODS OF USE THEREOF

(75) Inventors: Wai-Shing Peter Ko, Peachtree City, GA (US); Jon Eric Gibson, Oxford, GA (US)

(73) Assignee: Elumx LLC, Fayetteville, GA (US)

( * ) Notice: Subject to any disclaimer, the term of this patent is extended or adjusted under 35 U.S.C. 154(b) by 355 days.

(21) Appl. No.: 11/937,555

(22) Filed: Nov. 9, 2007

(65) Prior Publication Data

US 2009/0122563 A1    May 14, 2009

(51) Int. Cl.
- F21V 21/26 (2006.01)
- F21V 21/088 (2006.01)
- F21L 4/04 (2006.01)
- F27D 21/02 (2006.01)

(52) U.S. Cl. .................... 362/428; 362/92; 362/191; 362/198; 362/388; 362/396; 362/430; 248/228.6; 248/231.71

(58) Field of Classification Search .............. 362/418, 362/92, 190, 191, 198, 396, 388, 427–430; 248/226.11, 228.6, 230.6, 231.71, 229.15, 248/229.25
See application file for complete search history.

(56) References Cited

U.S. PATENT DOCUMENTS

| | | | | |
|---|---|---|---|---|
| 355,911 | A * | 1/1887 | Bartow, Jr. | 248/231.71 |
| 1,930,993 | A * | 10/1933 | Blodgett | 248/231.71 |
| 2,598,130 | A * | 5/1952 | Mallison | 248/231.71 |
| 2,655,337 | A * | 10/1953 | Diesfeld | 248/228.6 |
| 4,489,366 | A * | 12/1984 | Rozniecki | 362/427 |
| 4,494,177 | A * | 1/1985 | Matthews | 362/427 |
| 5,664,875 | A | 9/1997 | Hegedus | |
| 5,904,414 | A * | 5/1999 | Monteleone et al. | 362/205 |
| 6,202,640 | B1 | 3/2001 | Naperola et al. | |
| 6,851,820 | B2 * | 2/2005 | Choi et al. | 362/92 |
| 7,008,072 | B2 * | 3/2006 | Witzel et al. | 362/92 |
| 7,104,673 | B2 * | 9/2006 | Yu | 362/396 |
| 7,111,965 | B2 * | 9/2006 | Hsu | 362/396 |
| 7,213,940 | B1 | 5/2007 | Van De Ven et al. | |
| 7,290,898 | B2 * | 11/2007 | Martin et al. | 362/191 |
| 7,390,105 | B2 * | 6/2008 | Nelson et al. | 362/427 |

* cited by examiner

*Primary Examiner*—Alan Cariaso (57) ABSTRACT

An adjustable grill light having a lamp portion with light emitting diodes, a lens and a reflector, a gooseneck extension, and an adjustable clamp comprised of two members hingedly joined and locked together. After unlocking, the two members are secured in a selected position by a slidable plate, a fixed plate and a brace hingedly joined therebetween. Further, a timer controls the period during which the grill light is illuminated.

13 Claims, 9 Drawing Sheets

ADJUSTABLE GRILL LIGHT AND METHODS OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to lights that attach to base objects, and more specifically to an adjustable light for attaching to a grill, wherein the adjustable grill light folds down and/or is positionable at a selected angle via a hinged split dual-plate clamp base.

2. Description of Related Art

Grilling is a year round activity that is practiced so long as there is adequate light available to illuminate a grill surface and table extensions. A variety of lighting devices exist for providing night illumination, and such are often utilized by securing the lighting device to a base object, such as an outdoor grill. Many such devices require mains power, while there are a few portable and/or stand alone devices that are powered by batteries.

Modern gas grills are typically manufactured from metal, such as stainless steel, or of other non-combustible materials. Such grills typically have a flat table section for preparation or placement of food and/or plates, wherein the table sections may be placed on either or both sides of the grill surface. The table sections comprise a thickness that varies by application and manufacturer, and further may include overhangs or slanted angle edges that are different from a standard flat table top. Accordingly, grill lights that work for one size or type of table section are often not suited for a different size.

One existing device utilizes a gooseneck shaft with a handle attached thereto, wherein the handle facilitates movement of the gooseneck extension. However, this device requires a flat uniform thickness of table extension in order to be secured to the grill, limiting the range of the gooseneck shaft. Another such device requires its supporting leg to be inserted into an open support tube that retains the grill table section. Such device requires that the support tube have its plug end removed, thereby resulting in a hazardous condition, wherein the sharp edges of the support tube may injure a grill user, particularly during installation of the grill light, and further requires the grill to have such a table support tube.

In addition to the need for an adaptable grill light that may be utilized with a variety of grill surfaces, available grill lights, once installed, typically interfere with installation of a protective cover for the grill, such as a plastic cover that envelops the grill to protect same from the elements. This is typically because existing grill lights are the same height or taller than the grill and lack an ability to be collapsed easily without the need for removal or readjustment. Thus, such grill lights must typically be removed from the grill or readjusted to lower their height to accommodate the grill cover. Accordingly, such grill lights are inconvenient and typically avoided by grill users.

Furthermore, recent technology has provided availability of light emitting diodes (LEDs) as light sources having a long service life, but LEDs often have poor color rendering of red objects, and such is particularly the case with low cost cool white LEDs.

Therefore, it is readily apparent that there is a need for an adjustable grill light that can readily adapt to securing to a variety of table section thicknesses and profiles, that does not impede covering the grill, and that further enhances the red spectrum and/or provides a good color rendering index.

BRIEF SUMMARY OF THE INVENTION

Briefly described, in a preferred embodiment, the present invention overcomes the above-mentioned disadvantages and meets the recognized need for such a device by providing an adjustable grill light and methods of use thereof, wherein the adjustable grill light provides a securing mount that adapts to a variety of surfaces having different profiles and thickness, and which permits installation of the grill light at different angles, while retaining upright functionality via a hinged split dual-plate clamp base. Further, once mounted, the adjustable grill light can be folded to lay flat upon the grill or other surface, or, alternately, can be positioned at a selected angle. Lastly, in particular, the adjustable grill light includes a reflector that reflects back infrared radiation from the grill combining same with the white radiation from the LEDs to provide an increased red wavelength component resulting in better visibility of articles on a grill.

According to its major aspects and broadly stated, the present invention in its preferred form is an adjustable grill light comprising a lamp and an adjustable clamp with two hingedly joined plates. The lamp preferably has a light source comprised of light emitting diodes, such as, for exemplary purposes only, high intensity light emitting diodes. The lamp further has a lens covering the light emitting diodes that is selected to pass selected wavelengths and a reflector behind the light source that is selected to reflect selected wavelengths, enhancing the red color element of articles illuminated. The lamp is disposed at the end of a flexible extension, such as, for exemplary purposes only, a gooseneck extension, that is joined to the adjustable clamp base.

The adjustable grill light is secured in a selected location by its clamp portion and subsequently positioned at a selected angle by a slidable plate and a fixed plate, each having a pivot, and a brace therebetween having two rectangular apertures at opposite ends, wherein the pivot of the slidable plate cooperatively engages one of the two rectangular apertures and the pivot of the fixed plate cooperatively engages the other of the two rectangular apertures, thereby permitting movement of the brace about the two pivots as the slidable plate is adjusted, and permitting an angle of adjustment to be selected. In an alternate embodiment, the adjustable grill light is positioned at a selected angle by a slidable plate and a fixed plate, each having a pivot hinge portion, and a brace therebetween having a complementary pivot hinge portion that cooperatively engages the pivot hinge on the fixed and slidable plates, and wherein a hinge pin fastener engages with the pivot hinge portions of the fixed plate, the slidable plate and the brace, thereby permitting movement of the brace about the two hinges as the slidable plate is adjusted, and permitting an angle of adjustment to be selected. Further, it will be recognized that other pivoting fasteners than hinge/pin, as are known in the art, could be utilized without departing from the spirit of the present invention.

The adjustable grill light also comprises a turning lock mechanism having a locking pin disposed perpendicularly through a rod that is utilized to secure the two hingedly joined plates together for storage or for use when secured in closed position for use on a horizontal surface.

In use, to illuminate a grill or other selected area, the adjustable grill light is secured to a surface of a grill via the split dual-plate hinged adjustable clamp base, wherein the surface can be horizontal, vertical or any angle in between. The grill light is subsequently adjusted by unlocking the two plates and opening same around the hinge and fixing the plates in a selected open angle by sliding the slidable plate and securing same, wherein the slidable plate, the fixed plate and the brace therebetween fix the angle between the two plates of the clamp base. The brace is connected to and movable about pivots on the slidable and fixed plates. Removal of the hinge pin on the fixed plate of the alternate embodiment facilitates quick release to fold the lamp/extension to permit rapid covering of the grill with a grill cover when desired.

More specifically, the present invention is an adjustable grill light having a body, an extension, a lamp and a base, wherein the extension is preferably a flexible gooseneck extension. The base comprises a clamping mechanism having an upper portion and lower portion, wherein the upper portion and the lower portion are hingedly joined via a hinge to permit opening of the upper portion at a selected angle from the lower portion.

The base comprises a slide rod, a clamp arm, and a securing stop with a clamp adjusting screw, wherein the clamp adjusting screw secures the stop on the slide rod below the clamp arm. The base further has a threaded rod with a wingnut secured at one end thereof and a clamp foot at the other end thereof. The threaded rod passes through the clamp arm, and the clamp arm is threaded to receive the threaded rod.

The body comprises a battery access cover that is threadedly joined to the body, and upon removal of the battery access cover access to a set of batteries is obtained. The batteries are optionally contained in a removable battery tray. The batteries are in electrical communication with the lamp and power is controlled by a switch. It will be recognized by those skilled in the art that mains power could be provided in lieu of batteries via a power cord.

The upper portion of the base has a fixed plate secured thereto upper portion and the lower portion has a slidable plate secured via loosenable fasteners thereto to permit selective adjustment and locking of the slidable plate in position. An opening in the brace pivotally engages with a hook portion of the slidable plate, and a second opening of the brace pivotally engages a hook portion of the fixed plate. Pivoting engagement of the hooks with the openings permits positioning of the upper portion at a selected angle to the lower portion for subsequent securing of upper and lower portions in position.

In use, the adjustable grill light is secured to a horizontal surface, a vertical surface, or a surface sloping at any angle between horizontal and vertical. The lower portion has a rubber pad thereon provides frictional grip to prevent the lower portion from moving once it is clamped to the surface. Once clamped, a securing stop is slidably positioned on a slide rod to move a clamp foot loosely against the other side of the surface and a clamp adjusting screw is tightened. Once the clamp foot is in contact with the surface, it is tightened against the surface via threaded rod by turning a wingnut.

Once secured to a selected location, the adjustable grill light is adjusted by unlocking the upper portion from lower portion and hingedly moving the unsecured portion of upper portion away from the lower portion. Once a selected angle has been achieved, the upper portion and lower portion are maintained at the selected angle by positioning of a slidable plate, which is locked by tightening fasteners.

A first opening in a brace engages a hook portion of the slidable plate, and a second opening in the brace engages a hook portion of the fixed plate, thereby securing the upper and lower portions at the selected angle. Once mounted in position, the adjustable grill light is further adjusted by movement of the gooseneck extension into a desired position, to aim the lamp at an area selected for illumination.

The lamp has a switch that controls light emitting diodes (LEDs). A lens covers the LEDs and a reflector behind the LEDs reflects their light forward. Both the lens and the reflector may optionally be selected to pass/reflect specific wavelengths of light to enhance the red color element of articles illuminated by the adjustable grill light.

The upper and lower portions of the base are locked together by a quarter turn knob. The knob is connected to a stud that has a rod insert at one end passing perpendicularly therethrough. The lower portion has an opening therein with a locking plate. A washer and a rubber gasket are disposed around the stud between the locking plate and the upper portion of the base to provide compression when locked. To close and lock the upper portion and the lower portion together, the rod insert engages a locking plate and rotates a quarter turn.

The body is removably secured within a retaining ridge via fasteners to permit removal of the body, the extension and the lamp.

In an alternate embodiment, the fixed plate and the slidable plate each comprise half portions of a hinge, and the brace has complementary half portions of a hinge at each end thereof. The complementary hinge portions of the fixed plate are assembled to form a hinge by insertion of a hinge pin, and the complementary hinge portions of the slidable plate are assembled to form a hinge in similar fashion by insertion of a hinge pin. The pins are optionally removable, and may comprise an 'L' shape.

Accordingly, a feature and advantage of the present invention is its ability to fold flat to permit installation of a grill cover over the grill and lamp.

Another feature and advantage of the present invention is its ability to be attached to any selected flat horizontal, vertical, or to an angled surface.

Still another feature and advantage of the present invention is its ability to be secured to a variety of surfaces having different profiles and thicknesses.

Yet another feature and advantage of the present invention is its flexible neck to illuminate a selected area of the grill.

Yet still another feature and advantage of the present invention is that if conserves energy via the automatic shutoff of light after a preprogrammed time.

A further feature and advantage of the present invention is its ability to enhance the red color element of articles illuminated by the adjustable grill light.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-6C, the present invention in a preferred embodiment is adjustable grill light 10, wherein adjustable grill light 10 comprises body 20, extension 30, lamp 40 and base 50, wherein extension 30 is preferably a flexible gooseneck extension. It will be recognized by those skilled in the art that other forms of adjustable extensions could be utilized without departing from the spirit of the present invention. Base 50 comprises a clamping mechanism having upper plate member 120 and lower plate member 110, wherein upper plate member 120 and lower plate member 110 are hingedly joined via hinge 130, thereby permitting opening of upper plate member 120 at a selected angle from lower plate member 110.

Base 50 further comprises slide rod 60, clamp arm 140, securing stop 150 having clamp adjusting screw 155, wherein clamp adjusting screw 155 secures stop 150 on slide rod 60 below clamp arm 140, threaded rod 80 having wingnut 90 fixedly secured at one end thereof and clamp foot 100 disposed at the other end of threaded rod 80, wherein threaded rod 80 passes through clamp arm 140, and wherein clamp arm 140 is threaded to threadedly receive threaded rod 80.

Body 20 comprises battery access cover 70, wherein battery access cover 70 is threadedly joined to body 20, and wherein removal of battery access cover 70 (best shown in FIG. 1B) permits access to batteries 160, and wherein batteries 160 are optionally disposed in battery tray 165 within tube 170 for ease of removal. Tube 170 is in electrical communication with one terminal of batteries 160 and thereby provides a ground return to lamp 40 via battery access cover 70 and extension 30 or via wires therewithin. The other terminal of batteries 160 is in electrical communication with lamp 40 and switch 200 via wiring (not shown) within battery access cover 70, extension 30 and lamp 40. It will be recognized by those skilled in the art that power sources other than batteries, such as, for exemplary purposes only, alternating current corded power, could be utilized without departing from the spirit of the present invention.

Figure 1A:
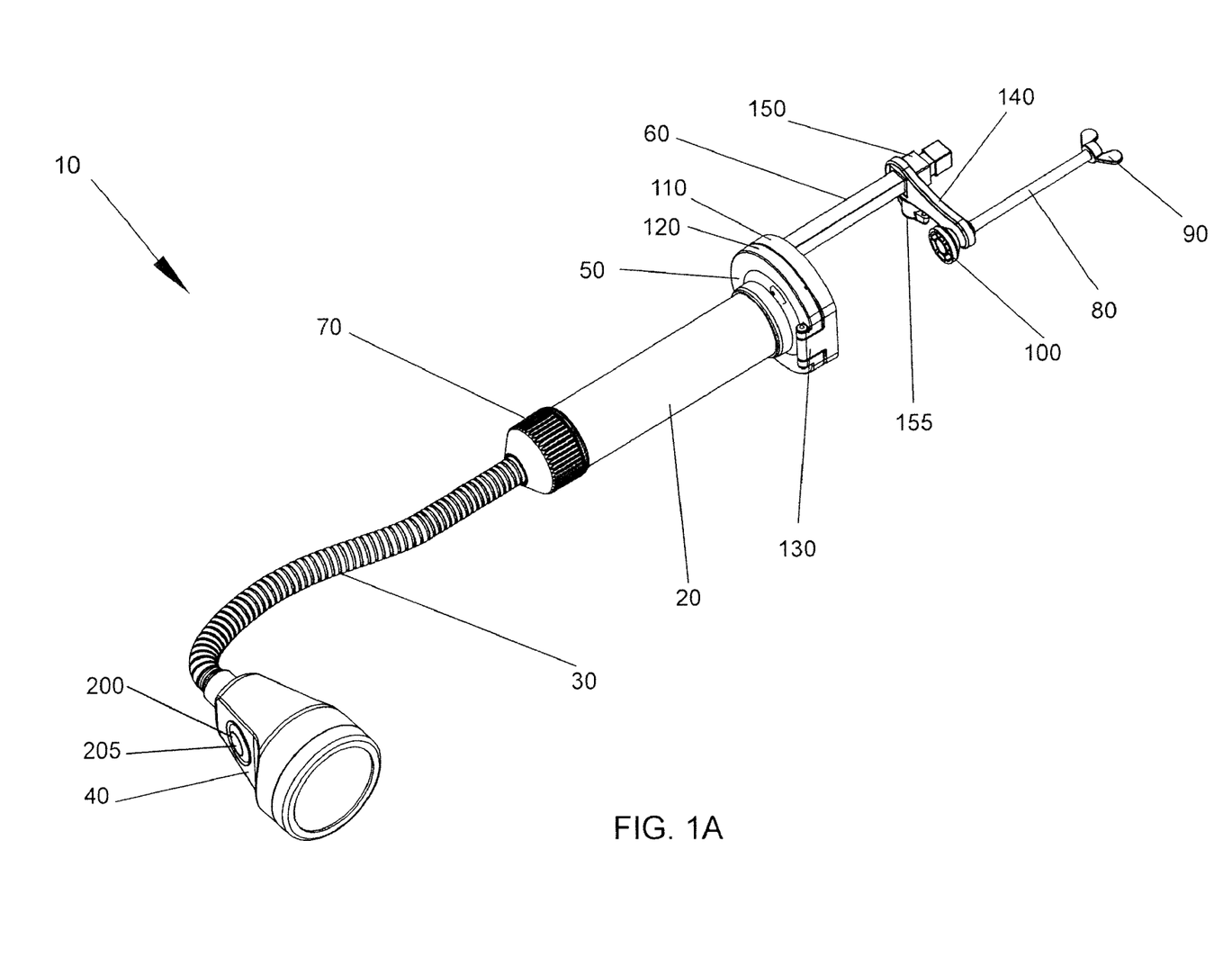
FIG. 1A is a perspective view of an adjustable grill light according to a preferred embodiment of the present invention.
Figure 1B:
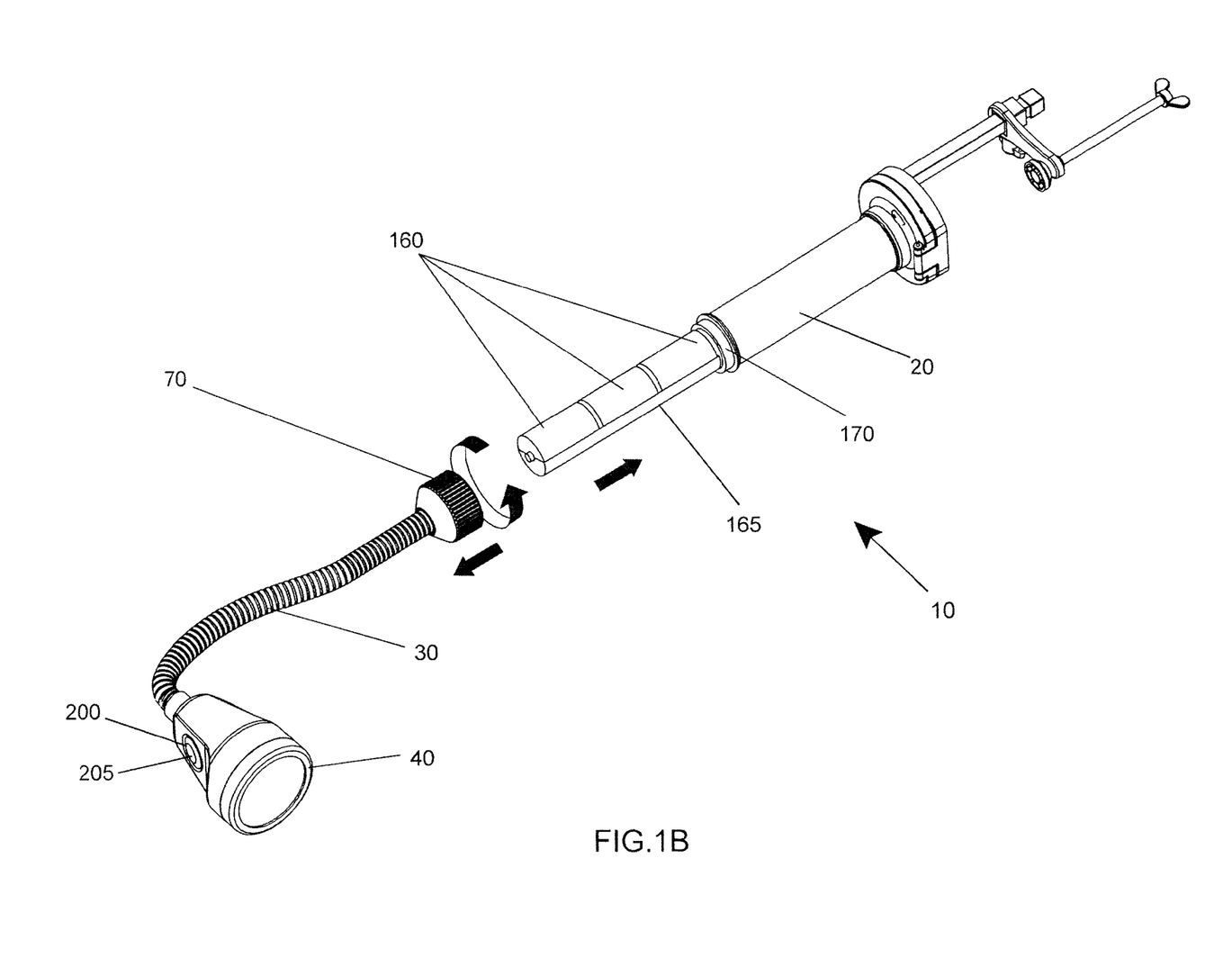
FIG. 1B is a perspective view of an adjustable grill light according to a preferred embodiment of the present invention, with battery tray partially removed.
Figure 2A:
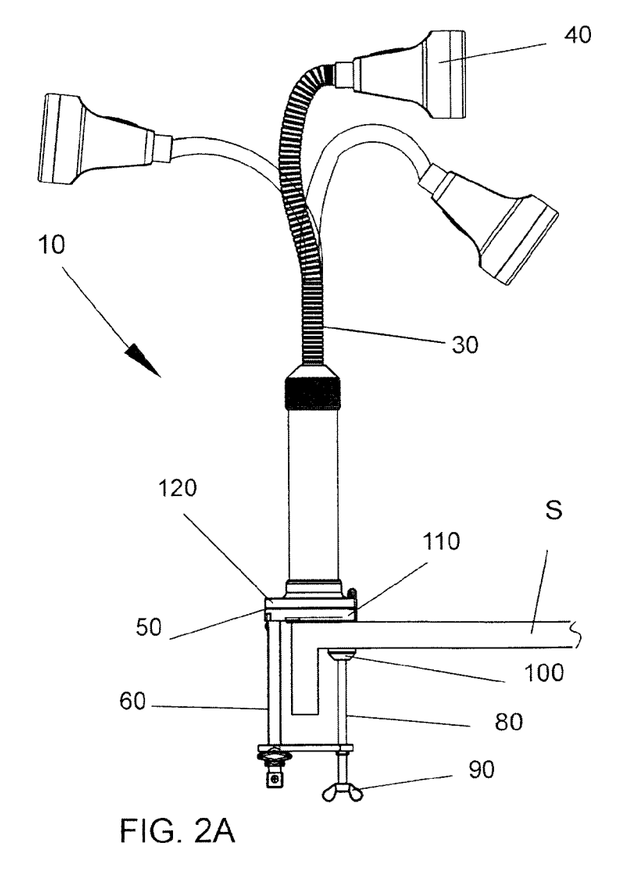
FIG. 2A is a side view of an adjustable grill light according to a preferred embodiment of the present invention, shown mounted to a horizontal surface.
Figure 2B:
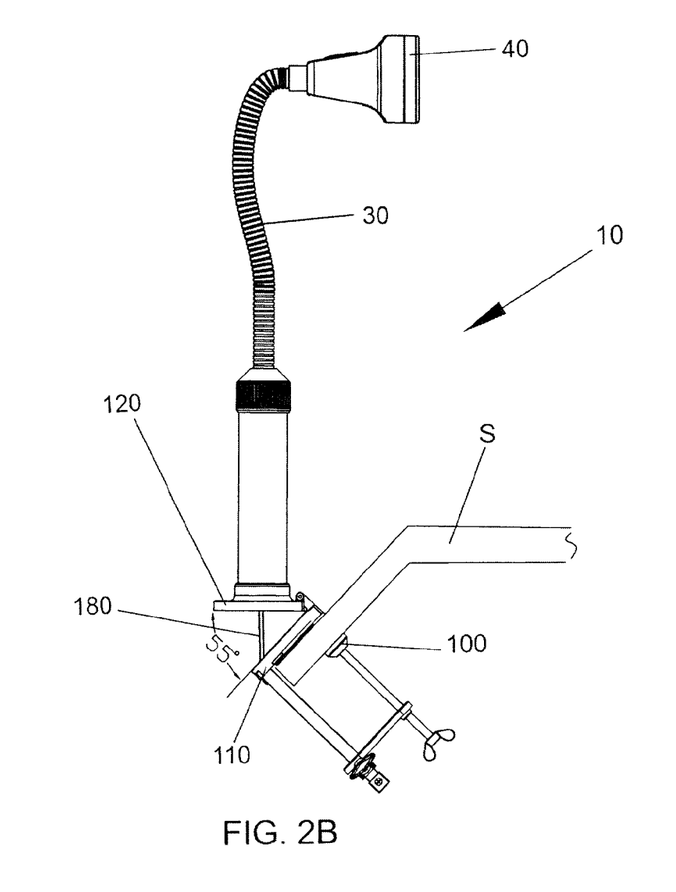
FIG. 2B is a side view of an adjustable grill light according to a preferred embodiment of the present invention, shown mounted to an angled flanged surface and adjusted to a selected angle.
Figure 2C:
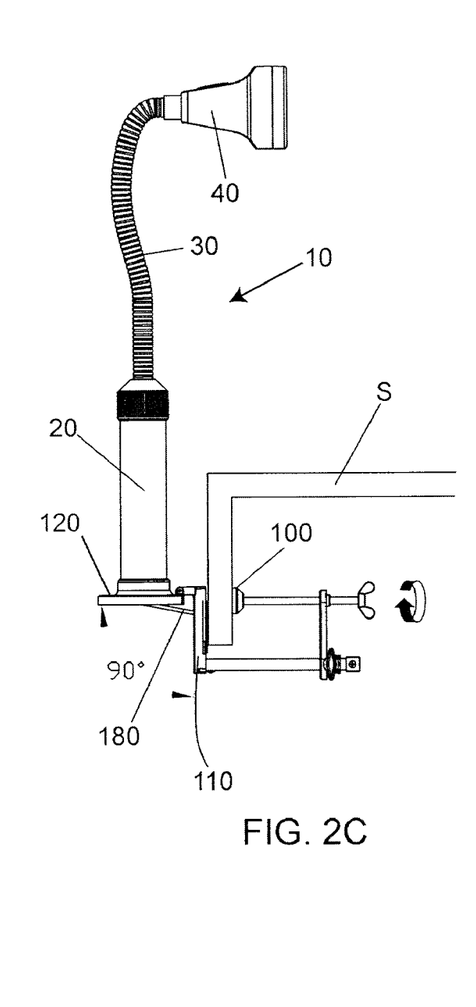
FIG. 2C is a side view of an adjustable grill light according to a preferred embodiment of the present invention, shown mounted to a vertical surface and adjusted to a selected angle.
Figure 2D:
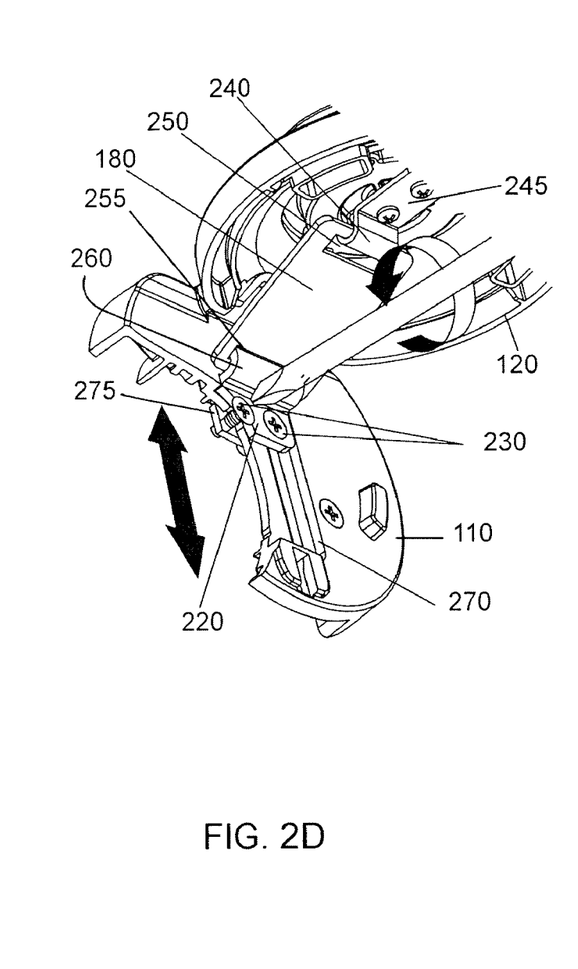
FIG. 2D is a cutaway perspective view of a plate adjusting mechanism of an adjustable grill light according to a preferred embodiment of the present invention.
Figure 2E:
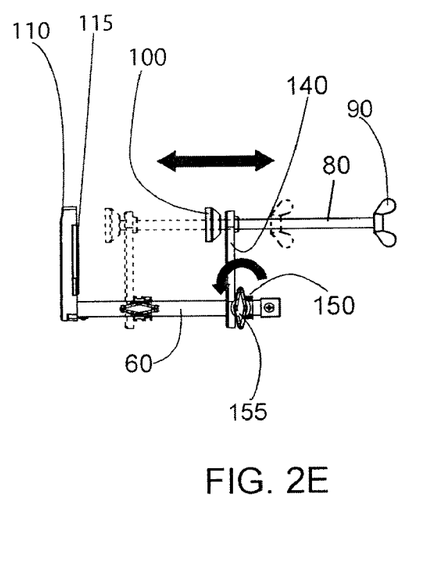
FIG. 2E is a side view of a clamp portion of an adjustable grill light according to a preferred embodiment of the present invention.

Referring now more particularly to FIG. 2D, fixed plate 245 is fixedly secured to upper plate member 120 and slidable plate 220 is slidably secured via fasteners 230 to lower plate member 110, wherein fasteners 230 pass through slidable plate 220 and slots 270 of lower plate member 110 and threadedly engage retainer 275, permitting selective adjustment and locking of slidable plate 220 in position. First opening 255 in brace 180 pivotally engages hook 260 of slidable plate 220, wherein second opening 250 of brace 180 pivotally engages hook 240 of fixed plate 245. Pivoting engagement of hooks 240, 260 with openings 250, 255 permits positioning of upper plate member 120 at a selected angle to lower plate member 110 and securing of plate members 110, 120 in position.

Referring now more particularly to FIGS. 2A-2E and FIGS. 5A-5B, in use, adjustable grill light 10 is secured to substrate S, wherein substrate S comprises a horizontal surface, a vertical surface, or a surface sloping at any angle between horizontal and vertical. Lower plate member 110 comprises rubber pad 115 (best shown in FIG. 2E), wherein when lower plate member 110 is disposed against substrate S, rubber pad 115 provides frictional grip to prevent lower plate member 110 from moving once lower plate member 110 is clamped to substrate S. Subsequent to placement of lower plate member 110 on substrate S, securing stop 150 is slidably positioned on slide rod 60 to move clamp foot 100 loosely against substrate S and clamp adjusting screw 155 is tightened. Once clamp foot 100 is proximate substrate S, clamp foot 100 is tightened against substrate S by rotation of threaded rod 80 via wingnut 90, thereby securing adjustable grill light 10 to substrate S.

Once adjustable grill light 10 has been secured to a selected location, it is pivotely adjusted by unlocking upper plate member 120 from lower plate member 110 and hingedly moving the unsecured portion of upper plate member 120 away from lower plate member 110 as described hereinabove. Once a selected angle has been achieved, upper plate member 120 and lower plate member 110 are maintained at the selected angle by positioning of slidable plate 220, and locking same via tightening of fasteners 230, wherein first opening 255 in brace 180 engages hook 260 of slidable plate 220, and wherein second opening 250 of brace 180 engages hook 240 of fixed plate 245, thereby securing plate members 110, 120 at the selected angle. Once mounted in position, adjustable grill light 10 is further adjusted by movement of extension 30 into a desired position, such that lamp 40 is aimed at an area selected for illumination.

Figure 3:
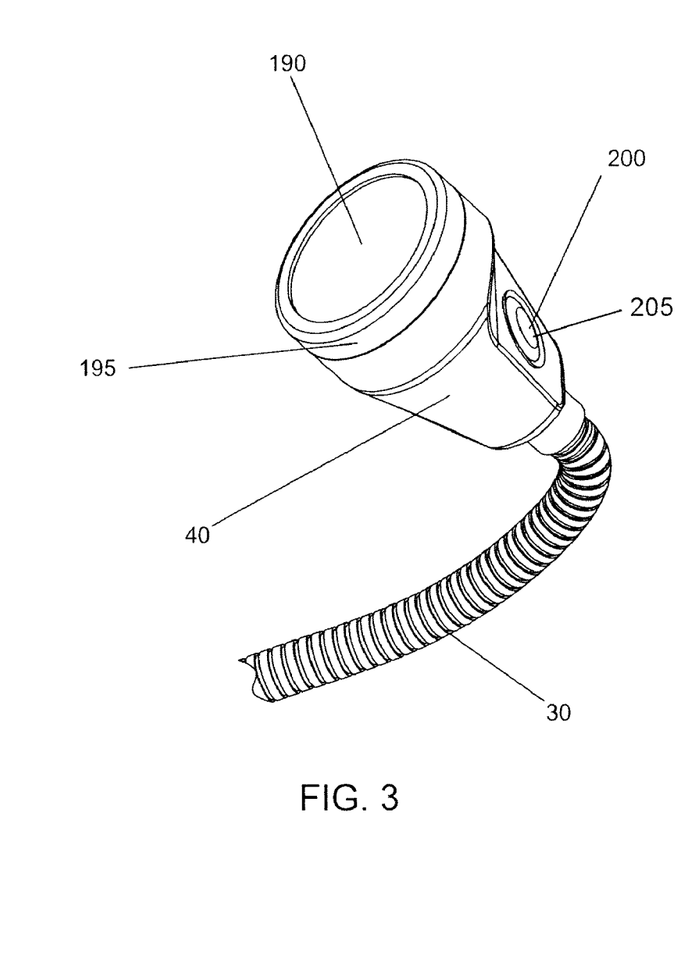
FIG. 3 is a perspective view of a lamp portion of an adjustable grill light according to a preferred embodiment of the present invention with lens in place.
Figure 4:
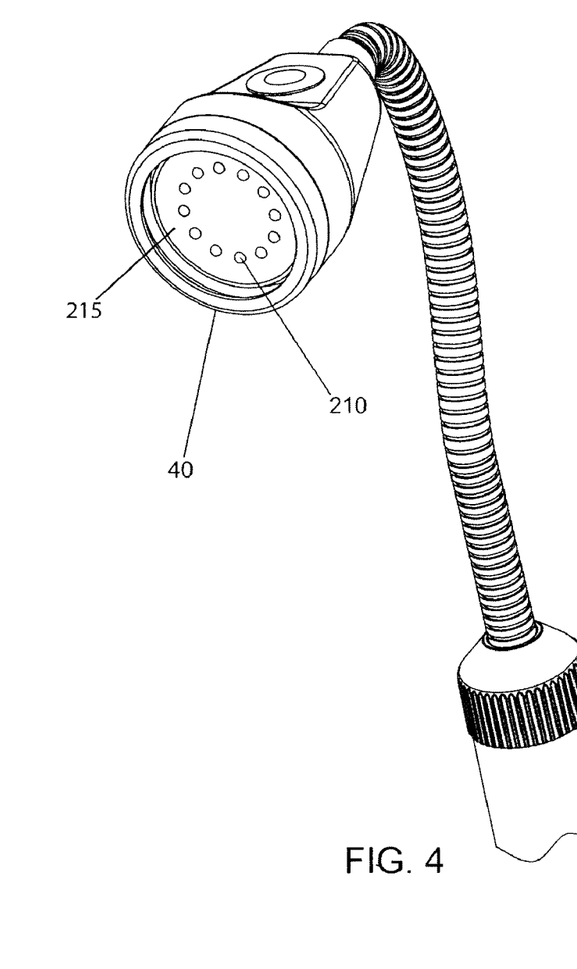
FIG. 4 is a perspective view of a lamp portion of an adjustable grill light according to a preferred embodiment of the present invention, with lens removed to show light emitting diodes and reflector.
Figure 5A:
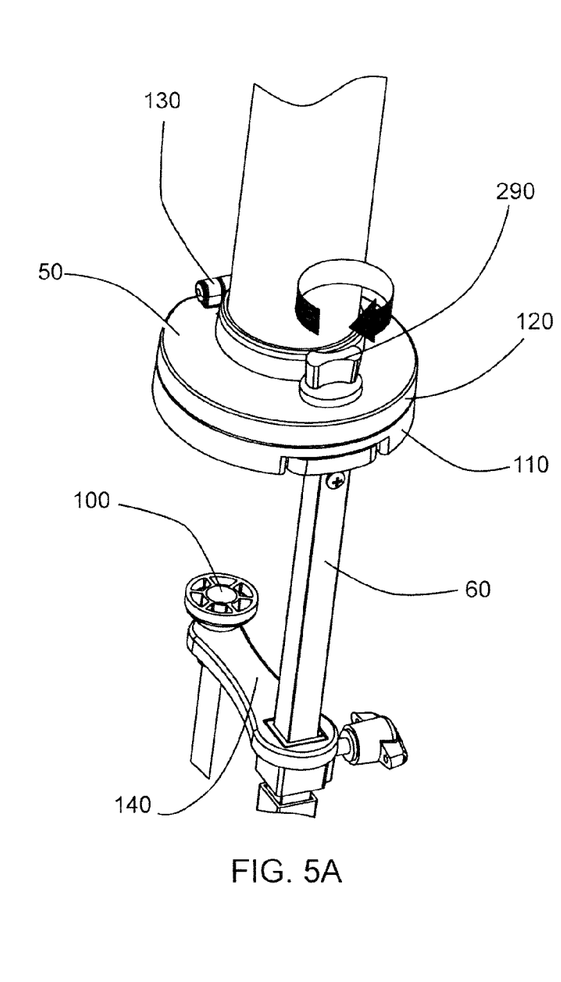
FIG. 5A is a perspective view of a clamp locking mechanism of an adjustable grill light according to a preferred embodiment of the present invention, shown closed and locked.
Figure 5B:
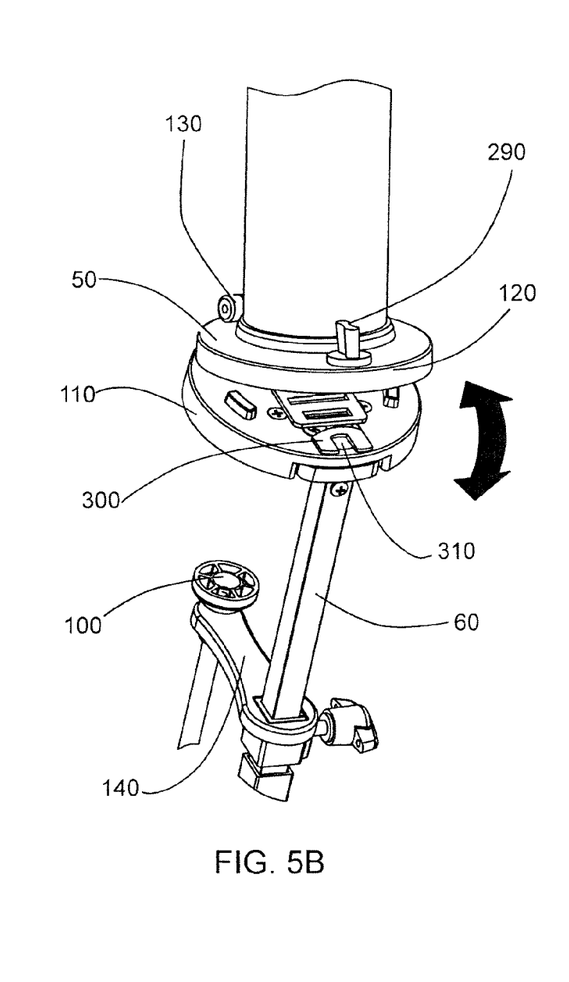
FIG. 5B is a perspective view of a clamp locking mechanism of an adjustable grill light according to an alternate embodiment of the present invention, shown partially open.

Referring now more particularly to FIGS. 3-4, lamp 40 comprises switch 200, lens 190, lens retaining ring 195, light emitting diodes (LEDs) 210 and reflector 215, wherein removal of lens retaining ring 195 provides access to LEDs 210. LEDs 210 are disposed behind lens 190 and reflector 215 is disposed behind LEDs 210. Lens 190 is optionally chosen to pass a selected wavelength of light, and further to provide protection to LEDs 210 and reflector 215. LEDs 210 are preferably cool white LEDs, but it will be recognized by those skilled in the art that LEDs of any selected color could be chosen. It will be further recognized by those skilled in the art that other light sources than LEDs 210 could be utilized, such as, for exemplary purposes only, fluorescent or incandescent light sources.

Reflector 215 is chosen to reflect light of a selected wavelength, thereby providing improved CRI. Switch 200 is an 'on-off' push button switch; however, it will be recognized by those skilled in the art that other types of switching mechanisms to provide or interrupt power from a power source to a lamp could be utilized without departing from the spirit of the present invention. Switch 200 could further control timer 205, wherein timer 205 controls the period during which adjustable grill light 10 is illuminated.

Turning now to FIGS. 5A, 5B, 6A, 6B and 6C, depicted therein is base 50, wherein plate members 110, 120 comprises knob 290, wherein rotation of knob 290 by a quarter turn, releases or locks upper plate member 120 from/to lower plate member 110.

Knob 290 is threaded to receive threaded stud 320, wherein threaded stud 320 has disposed therethrough rod insert 350, and wherein rotation of knob 290 turns threaded stud 320, thereby rotating rod insert 350. Lower plate member 110 comprises opening 370 and locking plate 300, wherein locking plate 300 is disposed on the top side of lower plate member 110, between lower plate member 110 and upper plate member 120. Locking plate 300 is fixedly secured to lower plate member 110, such as, for exemplary purposes only, welding. Washer 340 and rubber gasket 330 are disposed around threaded stud 320 between locking plate 300 and upper plate member 120.

When closing upper plate member 120 to lower plate member 110 to lock same together, rod insert 350 and threaded stud 320 enter opening 370. Rotation of knob 290 by a quarter turn causes rod insert 350 to engage locking plate 300, thereby locking upper plate member 110 together. Reverse rotation of knob 290 frees rod insert 350 from locking plate 300, thereby permitting opening of upper plate member 120 from lower plate member 110. Washer 340 and rubber gasket 330 provide compressive force that retains rod insert 350 against locking plate 300 when in locked position.

Figures 6A, 6B, 6C:
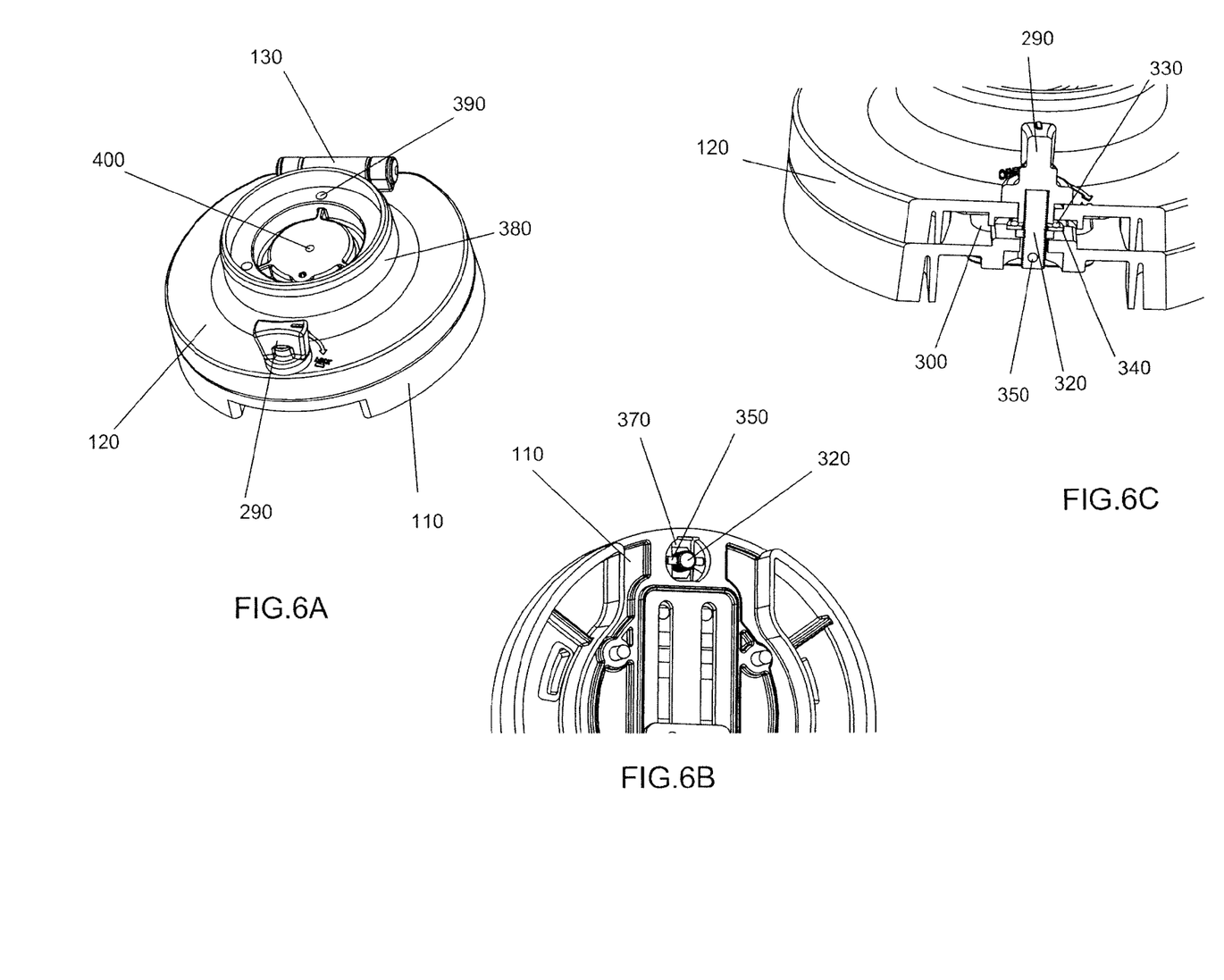
FIG. 6A is a perspective view of a clamp locking mechanism of an adjustable grill light according to a preferred embodiment of the present invention, shown with lamp, body and extension removed for clarity.
FIG. 6B is a bottom perspective view of a clamp locking mechanism of an adjustable grill light according to a preferred embodiment of the present invention.
FIG. 6C is a side cross-sectional perspective view of a clamp locking mechanism of an adjustable grill light according to a preferred embodiment of the present invention.

Turning now more particularly to FIG. 6A, upper portion 120 comprises retaining ridge 380 and throughholes 390 and 400, wherein body 20 is removably secured within retaining ridge 380 via fasteners (not shown) that engage body via through holes 390, 400. In such fashion, body 20, extension 30 and lamp 40 can be removed from base 50 when desired, such as for replacement and or servicing.

Figure 7:
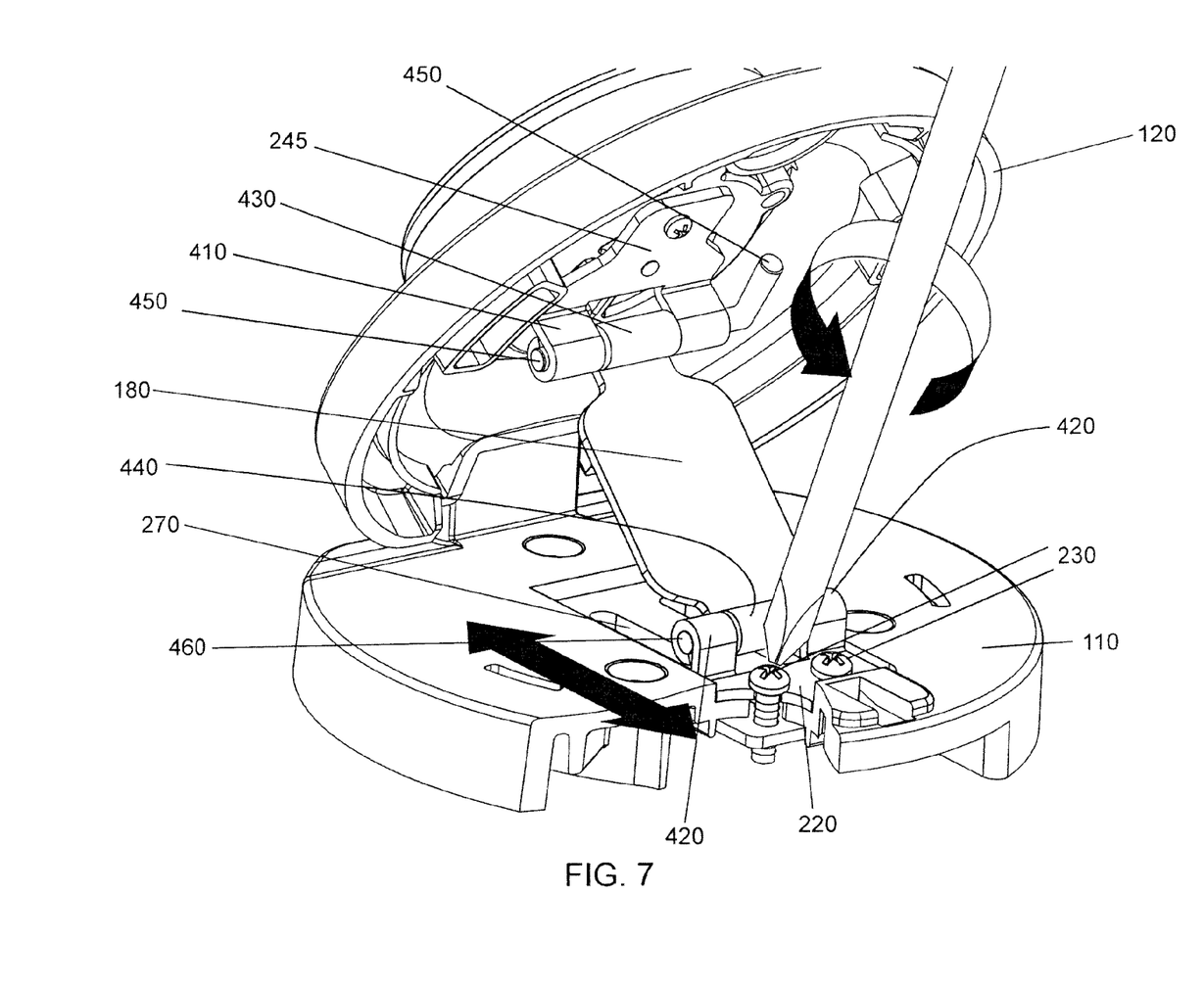
FIG. 7 is a cutaway perspective view of a plate adjusting mechanism of an adjustable grill light according to an alternate embodiment of the present invention.
Figure 8:
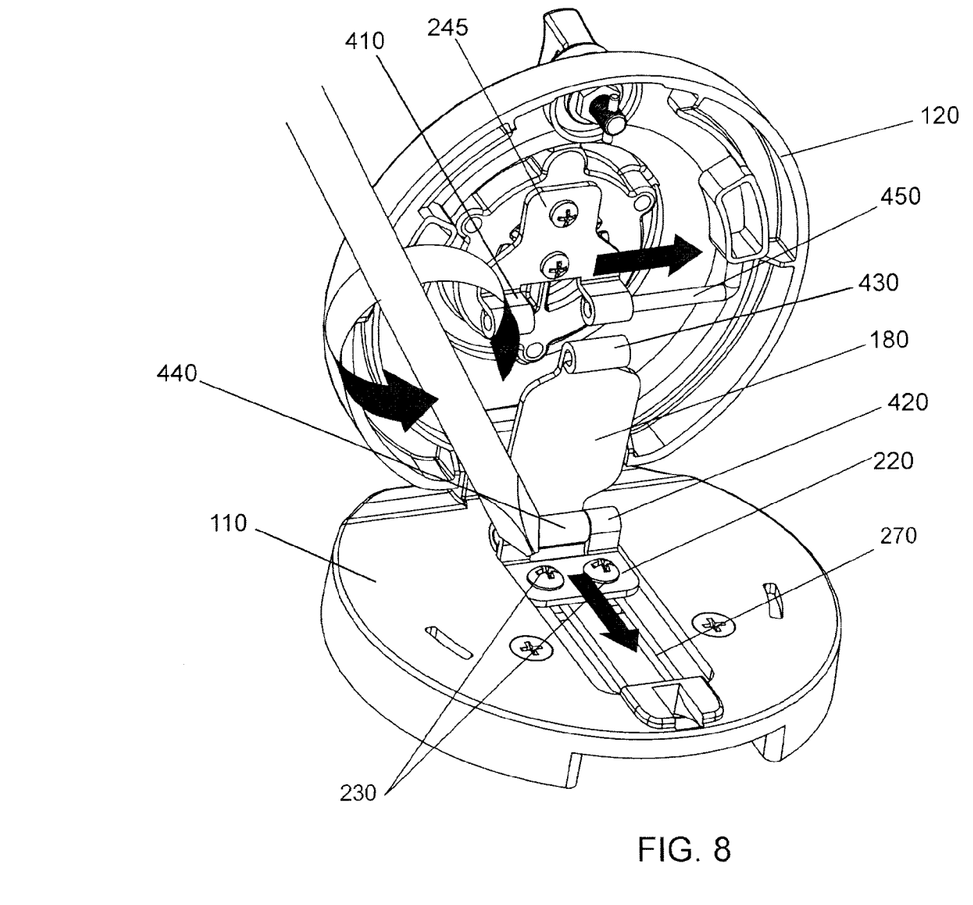
FIG. 8 is a perspective view of a plate adjusting mechanism of an adjustable grill light according to an alternate embodiment of the present invention, shown with hinge pin removed.

Referring now more specifically to FIGS. 7-8, depicted therein is an alternate embodiment of base 50, wherein the alternate embodiment of FIGS. 7-8 is substantially equivalent in form and function to that of the preferred embodiment detailed and illustrated in FIGS. 1-6C except as hereinafter specifically referenced. Specifically, the embodiment of FIGS. 7-8 comprises fixed plate 245 and slidable plate 220, wherein fixed plate 245 and slidable plate 220 each comprise half portions 410, 420 of a hinge, and wherein brace 180 has half portions 430, 440 of a hinge at each end thereof, and wherein complementary hinge portions 410, 430 of fixed plate 245 are assembled to form a hinge by insertion of pin 450, and wherein complementary hinge portions 420, 440 of slidable plate 220 are assembled to form a hinge by insertion of pin 460. Pin 450 and/or pin 460, wherein pin 450 and/or pin 460 comprises an 'L' shape, are removable to facilitate quick separation to facilitate folding adjustable grill light 10 to reduce its height to permit covering of grill and light with a grill cover.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. An adjustable grill light comprising:
 a lamp; and
 a body; and
 a base, wherein said base comprises an upper plate member and
 a lower plate member hingedly joined together whereby the upper plate member is contiguous with said body, and the lower plate member is rigidly joined with a mounting clamp portion of said base, wherein said upper plate member and said lower plate member are secured in a selected position by plate, a fixed plate and a brace, wherein said slidable plate and said fixed plate each comprise a first hinge portion, wherein said brace comprises two second hinge portions disposed at opposite ends of said brace, wherein said second hinge portions are complementary to said first hinge portions, wherein said first hinge portions and their complimentary second hinge portions are secured together with at least one hinge pin, and wherein at least one of said first and second hinge portions is disengageable wherein cooperative engagement of said slidable plate, said fixed plate and said brace permits an male of adjustment to be selected by movement of said slidable plate.

2. The adjustable grill light of claim 1, wherein said lamp comprises a light source.

3. The adjustable grill light of claim 2, wherein said light source comprises light emitting diodes.

4. The adjustable grill light of claim 2, wherein said adjustable grill light is secured to a surface, wherein the surface is selected from the group consisting of horizontal surfaces, vertical surfaces and angled surfaces.

5. The adjustable grill light of claim 2, further comprising a reflector.

6. The adjustable grill light of claim 1, further comprising a flexible extension between said lamp and said base.

7. The adjustable grill light of claim 1, wherein said base comprises a locking mechanism, and wherein said locking mechanism secures said upper plate member and said lower plate member together.

8. A method of lighting a grill, said method comprising the steps of:

obtaining an adjustable grill light having a lamp portion; and a base portion wherein said base portion comprises an upper plate member and a lower plate member hingedly joined together whereby the lower plate member is rigidly joined with a mounting clamp portion of said base portion, wherein said upper plate member and said lower plate member are secured in a selected position by a slidable plate, a fixed plate and a brace, wherein said slidable plate and said fixed plate each comprise a first hinge portion, wherein said brace comprises two second hinge portions disposed at opposite ends of said brace wherein said second hinge portions are complementary to said first hinge portions, wherein said first hinge portions and their complimentary second hinge portions are secured together with at least one hinge pin, and wherein at least one of said first and second hinge portions is disengageable, wherein cooperative engagement of said slidable plate said fixed plate and said brace permits an angle of adjustment to be selected by movement of said slidable plate;

securing said adjustable grill light to a surface of a grill; and adjusting said mounting clamp portion of said base portion.

9. A grill light comprising:

a lamp;

a base wherein said base comprises an upper plate member and a lower plate member hingedly joined together whereby the lower plate member is rigidly joined with a mounting clamp portion of said base, wherein said upper plate member and said lower plate member are secured in a selected position by a slidable plate, a fixed plate and a brace, wherein said slidable plate and said fixed plate each comprise a first hinge portion, wherein said brace comprises two second hinge portions disposed at opposite ends of said brace wherein said second hinge portions are complementary to said first hinge portions, wherein said first hinge portions and their complimentary second hinge portions are secured together with at least one hinge pin, and wherein at least one of said first and second hinge portions is disengageable, wherein cooperative engagement of said slidable plate, said fixed plate and said brace permits an angle of adjustment to be selected by movement of said slidable plate; and a gooseneck extension between said lamp and said base.

10. The grill light of claim 9, further comprising a slidable battery tray.

11. The grill light of claim 9, wherein said lamp comprises a reflector selected to reflect selected wavelengths of light.

12. The grill light of claim 9, wherein said base comprises a lock mechanism that secures said upper plate member and said lower plate member together.

13. The grill light of claim 9, wherein said lamp comprises a timer, wherein said timer controls the period during which said grill light is illuminated.

* * * * *